United States Patent
Sevindik

(10) Patent No.: US 12,199,765 B2
(45) Date of Patent: Jan. 14, 2025

(54) WIRELESS NETWORK AND SELECTED BANDWIDTH REPEAT

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 532 days.

(21) Appl. No.: 17/506,858

(22) Filed: Oct. 21, 2021

(65) Prior Publication Data

US 2023/0127504 A1   Apr. 27, 2023

(51) Int. Cl.
| | |
|---|---|
| H04W 4/00 | (2018.01) |
| H04L 1/08 | (2006.01) |
| H04W 16/26 | (2009.01) |
| H04W 72/20 | (2023.01) |

(52) U.S. Cl.
CPC ............. H04L 1/08 (2013.01); H04W 16/26 (2013.01); H04W 72/20 (2023.01)

(58) Field of Classification Search
CPC .................................. H04L 1/08; H04W 72/12
See application file for complete search history.

(56) References Cited

U.S. PATENT DOCUMENTS

| | | | | |
|---|---|---|---|---|
| 9,432,991 B2 * | 8/2016 | Khandekar | ......... | H04B 7/0632 |
| 11,503,487 B2 * | 11/2022 | Khalid | ................ | H04W 24/10 |
| 2009/0040973 A1 * | 2/2009 | Iwai | ......................... | H04L 5/00 |
| | | | | 370/329 |
| 2011/0292866 A1 * | 12/2011 | Zheng | ............... | H04W 52/0225 |
| | | | | 370/315 |
| 2012/0039242 A1 * | 2/2012 | Alexiou | ................ | H04W 72/52 |
| | | | | 370/315 |
| 2012/0147794 A1 * | 6/2012 | Chung | ................. | H04L 5/0057 |
| | | | | 370/280 |
| 2012/0176955 A1 * | 7/2012 | Ishii | ...................... | H04W 72/23 |
| | | | | 370/315 |
| 2014/0073337 A1 * | 3/2014 | Hong | ................. | H04W 72/046 |
| | | | | 455/452.1 |
| 2014/0342748 A1 * | 11/2014 | Zou | ....................... | H04W 28/16 |
| | | | | 455/452.1 |
| 2015/0244632 A1 * | 8/2015 | Katar | ....................... | H04B 3/54 |
| | | | | 370/230 |
| 2016/0249390 A1 * | 8/2016 | Hans | ...................... | H04W 76/10 |
| 2019/0140731 A1 * | 5/2019 | Mohan | ................ | H04L 63/0428 |
| 2019/0297555 A1 * | 9/2019 | Hampel | ................ | H04L 47/263 |
| 2021/0143893 A1 * | 5/2021 | Taneja | ................. | H04W 28/26 |
| 2023/0087814 A1 * | 3/2023 | Sevindik | ........... | H04B 7/15535 |
| | | | | 370/278 |

* cited by examiner

*Primary Examiner* — Elisabeth Benoit Magloire
(74) *Attorney, Agent, or Firm* — Armis IP Law, LLC

(57) ABSTRACT

A network environment includes a wireless base station and a repeater wireless station. The repeater wireless station receives first wireless communications and second wireless communications transmitted from a wireless base station. The repeater wireless station also receives schedule information notifying the repeater wireless station to retransmit at least the first wireless communications. In accordance with the schedule information, the repeater wireless station controls retransmission of the first wireless communications and the second wireless communications.

33 Claims, 15 Drawing Sheets

1500

AT A REPEATER WIRELESS STATION, RECEIVE FIRST WIRELESS COMMUNICATIONS AND SECOND WIRELESS COMMUNICATIONS TRANSMITTED FROM A WIRELESS BASE STATION — 1510

RECEIVE SCHEDULE INFORMATION, THE SCHEDULE INFORMATION NOTIFYING THE REPEATER WIRELESS STATION TO RETRANSMIT THE FIRST WIRELESS COMMUNICATIONS — 1520

IN ACCORDANCE WITH THE SCHEDULE INFORMATION, CONTROL RETRANSMISSION OF THE FIRST WIRELESS COMMUNICATIONS AND THE SECOND WIRELESS COMMUNICATIONS — 1530

SCHEDULE INFO.
120

| TIMESLOT | RBs TO REPEAT |
|---|---|
| TS #1 | NONE |
| TS #2 | 21-30 |
| TS #3 | NONE |
| TS #4 | NONE |
| TS #5 | NONE |
| TS #6 | 21-30 |
| TS #7 | 31-50 |
| TS #8 | NONE |
| TS #9 | NONE |
| TS #10 | 21-30 |

FIG. 5

WIRELESS NETWORK AND SELECTED BANDWIDTH REPEAT

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or so-called customer premises equipment. For example, a base station can be configured to communicate with the SAS to receive notification of one or more wireless channels allocated for its use.

Subsequent to registration and wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

Environmental sensing sensors are used in SAS controlled CBRS network to measure the radar activity in CBRS band. Sensors placed on the East coast and West coast are used to detect radar signals in 3.5 GHz CBRS band. When a signal is detected in the CBRS band, the ESC sensor notifies a spectrum access system that all nearby CBSD should power down and not transmit any signal in the CBRS band to reduce interference caused by those CBSDs.

Further, according to conventional techniques, the allocation management resource has full control of the CBSDs. However, the SAS does not have any control over RF repeater wireless stations that repeat received wireless signals in the network. Wireless signal repeaters are used in a respective 5G network to increase the network coverage. For example, conventional wireless repeaters simply repeat the RF signal they receive from gNB in both downlink (DL) and uplink (UL) directions. Typically, wireless signal repeaters are not smart devices and they just repeat a received wireless signal, which means that such repeaters are physical layer devices.

BRIEF DESCRIPTION OF EMBODIMENTS

Embodiments herein provide novel ways of improving wireless communications to one or more communication devices in a network environment.

More specifically, in one embodiment, a communication system includes a wireless base station and one or more repeater wireless stations. A repeater wireless station receives first wireless communications and second wireless communications transmitted from a wireless base station. The repeater wireless station also receives schedule information notifying the repeater wireless station to retransmit at least the first wireless communications. In accordance with the schedule information, the repeater wireless station controls retransmission of the first wireless communications and the second wireless communications.

The schedule information can include any suitable information. For example, in one embodiment, the schedule information indicates to retransmit the first wireless communications; the schedule information indicates not to retransmit (prevent transmission) of the second wireless communications. Controlling retransmission of the first wireless communication and the second wireless communications from the repeater wireless station includes: retransmitting the first wireless communications from the repeater wireless station, the retransmitted first wireless communications being a replica of the first wireless communications received from the wireless base station. Additionally, or alternatively, the controlling retransmission of the first wireless communications and the second wireless communications includes: preventing retransmission of the second wireless communications from the repeater wireless station.

Still further example embodiments herein include synchronizing the repeater wireless station with the wireless base station to receive the first wireless communications and the second wireless communications in different timeslots over a wireless communication link from the wireless base station. The schedule information specifies that one or more timeslots such as a first time slot of the multiple timeslots is assigned to the repeater wireless station. The schedule information further specifies that one or more timeslots such as a second time slot of the multiple timeslots is not assigned to the repeater wireless station.

The repeater wireless station uses the schedule information to determine which, if any, of the communications received from the wireless base station should be retransmitted from the repeater wireless station. For example, the repeater wireless station decodes the schedule information to identify that the repeater wireless station is assigned the first time slot in which to receive the first wireless communications. The repeater wireless station then receives the first wireless communications from the wireless base station in the first time slot. Thus, in accordance with the schedule information, the repeater wireless station re-transmits the first wireless communications from the repeater wireless station to a first mobile communication device.

In further example embodiments, the schedule information also specifies that a second time slot of the multiple timeslots is assigned to the repeater wireless station. The repeater wireless station decodes the schedule information to identify that the repeater wireless station is assigned the second time slot in which to repeat the first wireless communications. The repeater wireless station receives the second wireless communications from the wireless base station in the second time slot. In accordance with the schedule information, the repeater wireless station re-transmits the second wireless communications from the repeater wireless station to a second mobile communication device.

Note further that the repeater wireless station can be configured to receive the schedule information from any suitable one or more entities. For example, in one embodiment, the repeater wireless station receives the schedule information from the wireless base station.

In accordance with further example embodiments, the repeater wireless station is assigned multiple but fewer-than-all timeslots of a communications channel in which to re-transmit wireless communications received from the wireless base station. The controlled re-transmission of the first wireless communications and the second wireless communications includes: in accordance with the schedule information: i) re-transmitting the first wireless communications, as received in a first time slot, from the repeater wireless station to a first mobile communication device, and ii) re-transmitting the second wireless communications, as received in a second time slot, from the repeater wireless station to a second mobile communication device.

In still further example embodiments, an allocation management resource such as a SAS (Spectrum Access System) grants spectrum (such as 10 MHz blocks) to each CBSD (such as wireless station) in a network environment. The allocation management resource or other suitable entity also measures interference in each granted 10 MHz spectrum band, and if the interference amount in 10 MHz spectrum band is greater than a threshold, then the allocation management resource will power down the CBSD.

Controlling the direction and amount of signal transmitted from CBSD is crucial to manage interference. However, as previously discussed, the repeater wireless station will repeat the signal to increase the coverage of the network. This disclosure presents a method to control the interference while using the RF repeater to provide additional wireless coverage.

In accordance with more specific embodiments, the communication method according to embodiments herein includes the following operations.

CBSD turns on and connects with a spectrum access system;

The spectrum access system grants spectrum to the CBSD;

An RF repeater turns on and registers with CBSD, the RF repeater sends its location to CBSD;

CBSD has multiple sectors with a different/unique physical cell identity (PCI);

CBSD measures the total number of physical blocks used per sector, and performs the reverse calculation to calculate the amount of bandwidth used, (25 resource blocks corresponds to use of 5 MHz of bandwidth, 50 resource blocks corresponds to use of 10 MHz of bandwidth, 10 resource blocks corresponds to use of 2 MHz of bandwidth, etc.);

User terminals connected to the CBSD will notify the CBSD of their location;

CBSD calculates the amount of spectrum used by UEs at a certain location;

CBSD uses RF repeater nearest to UEs, and CBSD will start sending data to an RF repeater by sending the signal towards that direction, CBSD will also send the amount of bandwidth indicated to be repeated towards the UEs, (if UEs consume 5 MHz worth of resources blocks, then RF repeater repeats the 5 MHz bandwidth)

Since only fractional bandwidth in time is repeated instead of all of the allocated bandwidth, the wireless interference amount in that region will be lower than threshold interference level.

Embodiments herein are useful over conventional techniques. For example, techniques herein include unique ways of providing reduced interference via selective and controlled re-transmission of wireless communications from a repeater wireless station.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: at a repeater wireless station, receive first wireless communications and second wireless communications transmitted from a wireless base station; receive schedule information, the schedule information notifying the repeater wireless station to retransmit the first wireless communications; and in accordance with the schedule information, controlling retransmission of the first wireless communications and the second wireless communications.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating schedule information according to embodiments herein.

Figure 1:
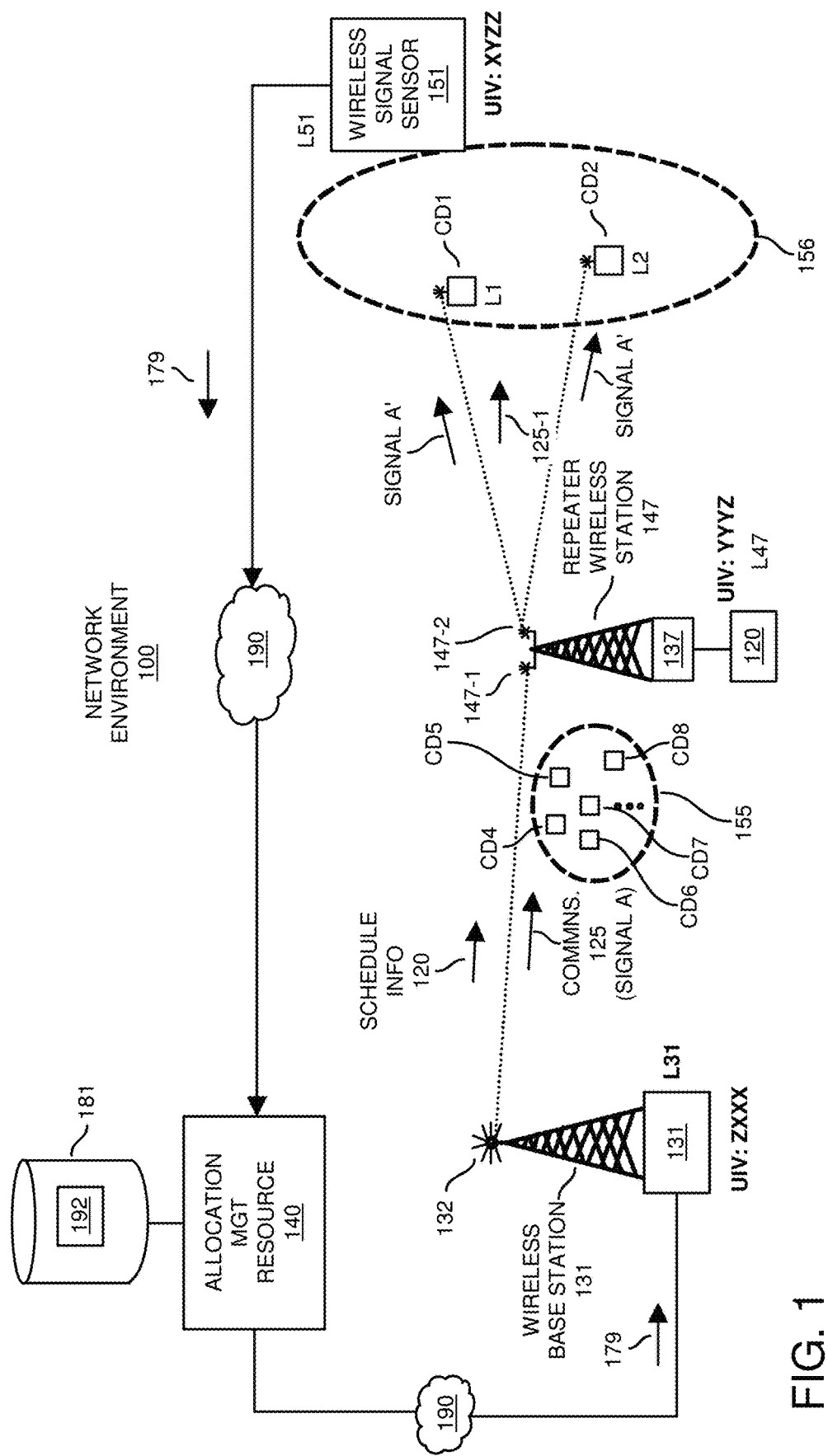
FIG. 1 is an example diagram illustrating a communication network environment and multiple wireless base stations implementing communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes a wireless base station and a repeater wireless station. The repeater wireless station receives first wireless communications and second wireless communications transmitted from a wireless base station. The repeater wireless station also receives schedule information notifying the repeater wireless station to retransmit at least the first wireless communications. In accordance with the schedule information, the repeater wireless station controls retransmission of the first wireless communications and the second wireless communications. In certain embodiments, the repeater wireless station supports both uplink and downlink communications.

Now, more specifically, with reference to the drawings, FIG. 1 is an example diagram illustrating a communication network environment and multiple wireless base stations implementing communications according to embodiments herein.

As shown, network environment 100 includes allocation management resource 140 (such as spectrum access system), repository 181, wireless base station 131, repeater wireless station 147, and wireless signal sensor 151.

Wireless network environment 100 includes any number of wireless base stations and corresponding power management resources. In this example embodiment, wireless base station 131 is includes a communication management resource to manage transmission of wireless communications in the network environment 100. Repeater wireless station 137 implements communication management resource 137 to manage transmission of wireless communications from the repeater wireless station 147.

Each of the wireless base stations includes respective one or more instances of antenna hardware to wirelessly communicate with mobile communication devices (a.k.a., user equipment) and/or other wireless stations such as repeater wireless stations. For example, in this embodiment, the wireless base station 131 includes antenna hardware 132 (such as one or more antenna elements) to transmit communications 125 such as wireless signal A.

Repeater wireless station 147 includes antennas such as first antenna hardware 138-1 to receive the wireless signal A and second antenna hardware 138-2 to communicate wireless signal A'.

Each of the wireless base station 131 and repeater wireless station 147 can be configured to support beamforming and directivity of respective wireless signals (such as signal A, signal A', etc.). Alternatively, the antenna hardware associated with the wireless base station 131 and the repeater wireless station 147 support omni-directional communications in the wireless network environment 100.

Note further that each of the resources in network environment 100 can be configured to include or be configured as appropriate hardware, software, or combination of hardware and software to carry out respective operations as discussed herein.

More specifically, the wireless base station 131 (such as communication management resource) as described herein can be implemented via respective wireless base station hardware, wireless base station software, or a combination of wireless base station hardware and wireless base station software; the repeater wireless station 147 as described herein can be implemented via respective repeater wireless station hardware, repeater wireless station software, or a combination of repeater wireless station hardware and repeater wireless station software; the wireless signal sensor 151 can be implemented via wireless signal sensor hardware, wireless signal sensor management software, or a combination of wireless signal sensor hardware and wireless signal sensor software; and so on.

As further shown in this example embodiment, the network 190 provides connectivity (such as shared communication link, cable, physical link, wireless link, etc.) between resources such as wireless signal sensor 151 and allocation management resource 140 as well as connectivity between allocation management resource 140 and the wireless base station 131.

Initially, the wireless base station 131 registers with the allocation management resource 140 for allocation of one or more wireless channel. In further example embodiments, the wireless base station 131 detects or knows of presence of repeater wireless station 147 and communicates such information to the allocation management resource 140.

For example, the repeater wireless station 147 (such as RF repeater) can be configured to wirelessly connect to wireless base station 131 and reports its location to the wireless base station 131. Alternatively, the wireless base station 131 communicates with an entity that provides location information indicating a location (such as predetermined location) of the repeater wireless station 147. In further example embodiments, the wireless base station 131 determines that the repeater wireless station 147 is connected to itself via receipt of information such as 'UE category' and/or identity information reported by the repeater wireless station 147 to the wireless base station 131.

Subsequent to registration, the allocation management resource 140 (such as a spectrum access system) grants spectrum (such as one or more wireless channels) to the wireless base station 131 and repeater wireless station 147. In one embodiment, the allocation management resource 140 allocates wireless channels from a CBRS band. Details of the allocated one or more wireless channels are discussed with respect to FIG. 13 and corresponding text.

Referring again to FIG. 1, via data 192, the allocation management resource 140 keeps track of the location (L47) of the repeater wireless station 147 and location (L31) of the wireless base station 131, etc.

The wireless base station 131 and the repeater wireless station 147 can be configured to communicate over any suitable type of wireless channel and/or wireless communication protocol (cellular wireless communication protocol. Wi-Fi™, etc.

Further in this example embodiment, subsequent to allocation of a respective wireless channel, the wireless base station 131 communicates signal A (such as a downlink signal) from antenna hardware 132 in the wireless network environment. The wireless signal supports communications with one or more mobile communication devices such as user equipment CD1, user equipment CD2, etc. In one embodiment, the repeater wireless station 147 is configured to receive the wireless signal A on antenna hardware 138-1 and then re-transmit the signal A as signal A' to the user equipment CD2 via antenna hardware 138-2. See FIG. 2.

Referring again to FIG. 1, in this example embodiment, the transmission of wireless signal A' is slightly delayed with respect to the original wireless signal A. In such an instance, the magnitude of the wireless signal A' itself or a combination of the signal A and A' may result in wireless interference sensed by the wireless signal sensor 151. In one embodiment, the wireless signal sensor 151 monitors a magnitude of communications 125 (as transmitted from the wireless base station 131) and communications 125-1 (as transmitted from the repeater wireless station 147). In one embodiment, the wireless signal sensor 151 provides feedback 179 to the wireless base station 131 indicating a level of wireless interference detected by the wireless signal sensor 151.

For example, in one embodiment, the wireless signal sensor (such as ESC or Environmental Sensing Capability) continuously measure the wireless signal power present in a spectrum used by the wireless base station 131 and repeater wireless station 147 such as the CBRS (Citizens Band Radio Service) band. An example of monitoring received wireless signals is further discussed in FIG. 2.

Figure 2:
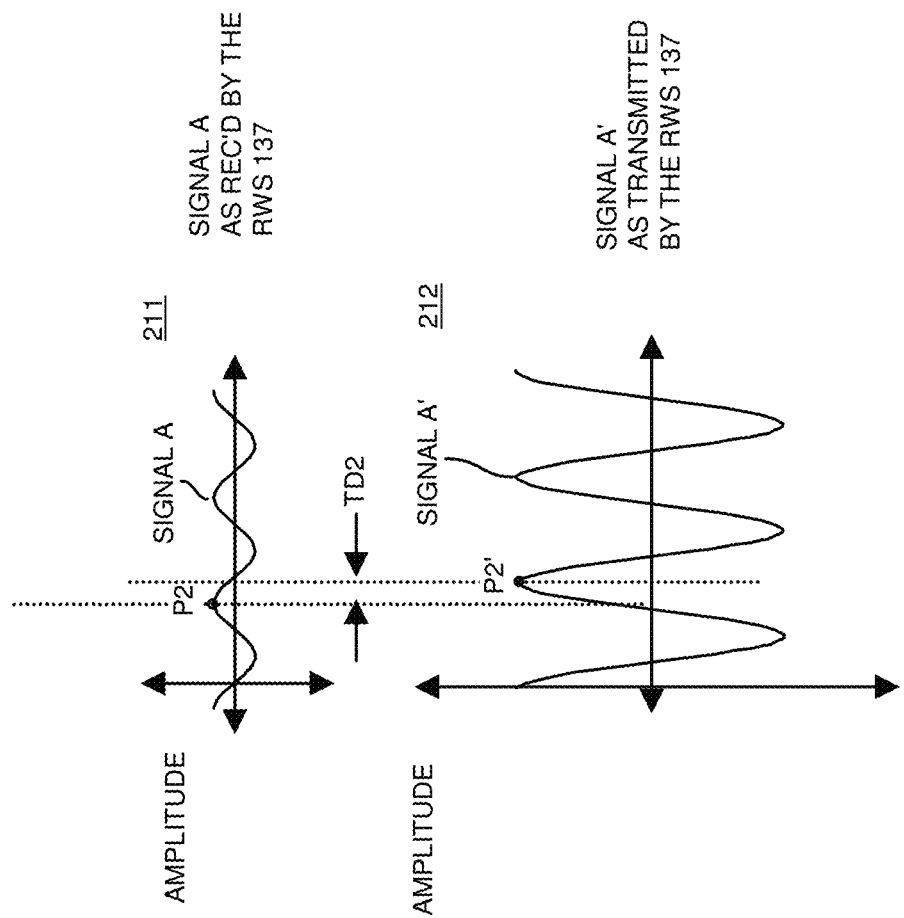
FIG. 2 is an example diagram illustrating an example of retransmitting a received wireless signal according to embodiments herein.

FIG. 2 is an example diagram illustrating an example of retransmitting a received wireless signal according to embodiments herein.

In this example embodiment, the repeater wireless station 147 receives signal A (such as part of wireless communications 125) from the wireless base station 131. When repeating a respective wireless signal, the repeater wireless station 147 performs a replication of the received signal A in graph 211 as repeated signal A' in graph 212. As shown, the signal A' is delayed by amount time delay TD2.

Referring again to FIG. 1, in one embodiment, the wireless base station 131 receives feedback 179 from the wireless signal sensor 151. In response to detecting that the magnitude of wireless signals or interference detected by the wireless signal sensor 151 is above a threshold value, the wireless base station 131 controls a magnitude of the communications 125 and/or communications 125-1 to ensure that the magnitude of the wireless interference in the region of wireless coverage 156 is below the threshold value.

Figure 3:
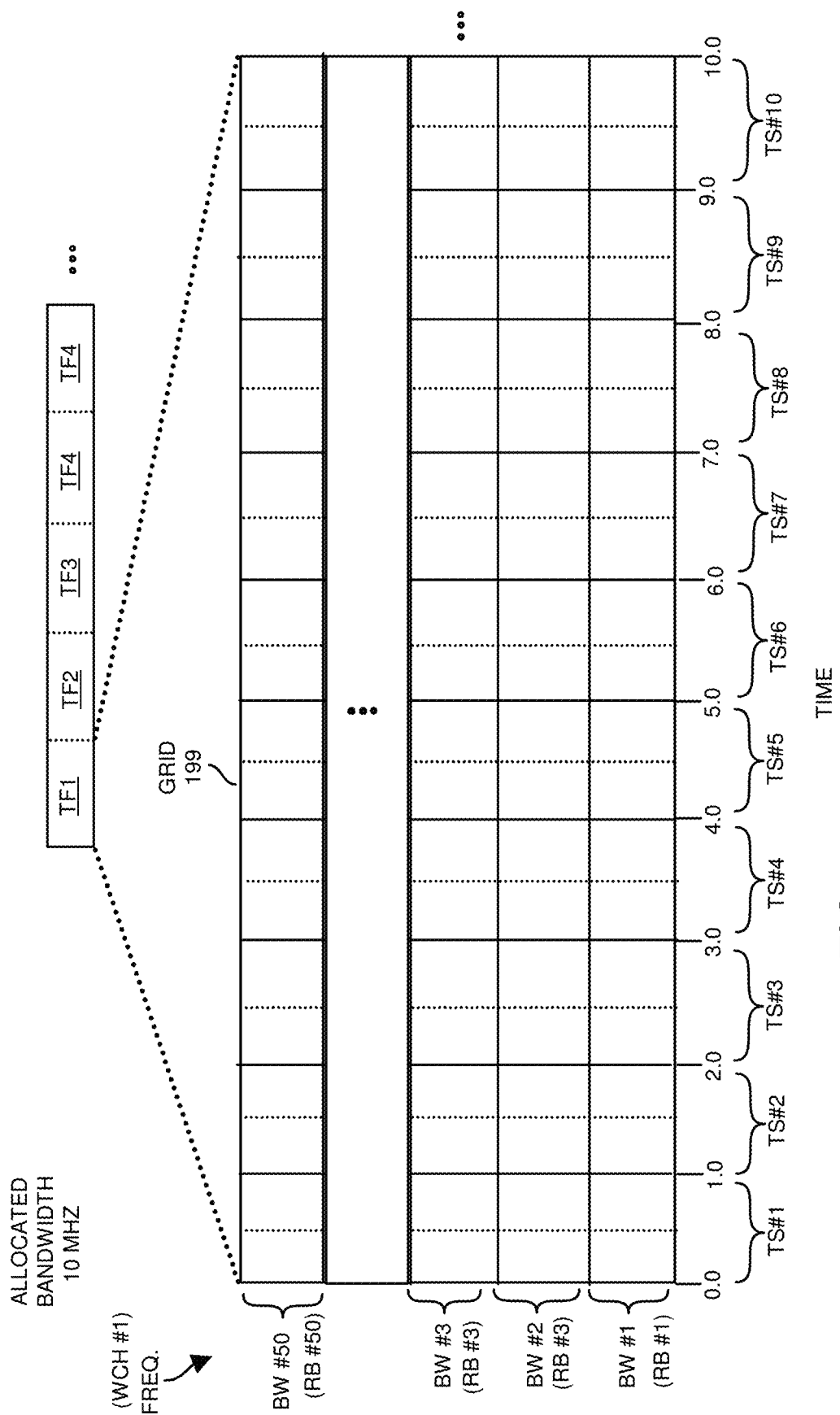
FIG. 3 is an example diagram illustrating implementation of multiple resource blocks to communicate data to multiple communication devices according to embodiments herein.

FIG. 3 is an example diagram illustrating implementation of multiple resource blocks to communicate data to multiple communication devices according to embodiments herein.

In one embodiment, the wireless base station 131 in the wireless station 147 are synchronized with respect to a master clock such that the wireless stations know when to transmit and/or receive wireless signals in a respective timeslot. In this example embodiment, each full frame (such as multiple timeframes TF1 to TF10) is 10 mS (milliseconds) in duration. Each timeframe (such as TF1, TF2, etc.) includes multiple timeslots (TS #1 to TS #10, 1 mS per timeslot) and corresponding 500 resource blocks (50 resource blocks per timeslot). Each timeslot and corresponding 50 resource blocks support 10 MHz of bandwidth (such as wireless channel #1). In one embodiment, each resource block is transmitted over a 1.0 mS of a respective time slot.

In this example embodiment, bandwidth #1 (such as a first portion of wireless channel #1) supports communication of a respective instance of resource block #1 during each of the different timeslots TS #1 to TS #10; bandwidth #2 (such as a second portion of wireless channel #1) supports communication of a respective instance of resource block #2 during each of the different timeslots TS #1 to TS #10; bandwidth #3 (such as a third portion of wireless channel #1) supports communication of a respective instance of resource block #3 during each of the different timeslots TS #1 to TS #10; and so on.

Figure 4:
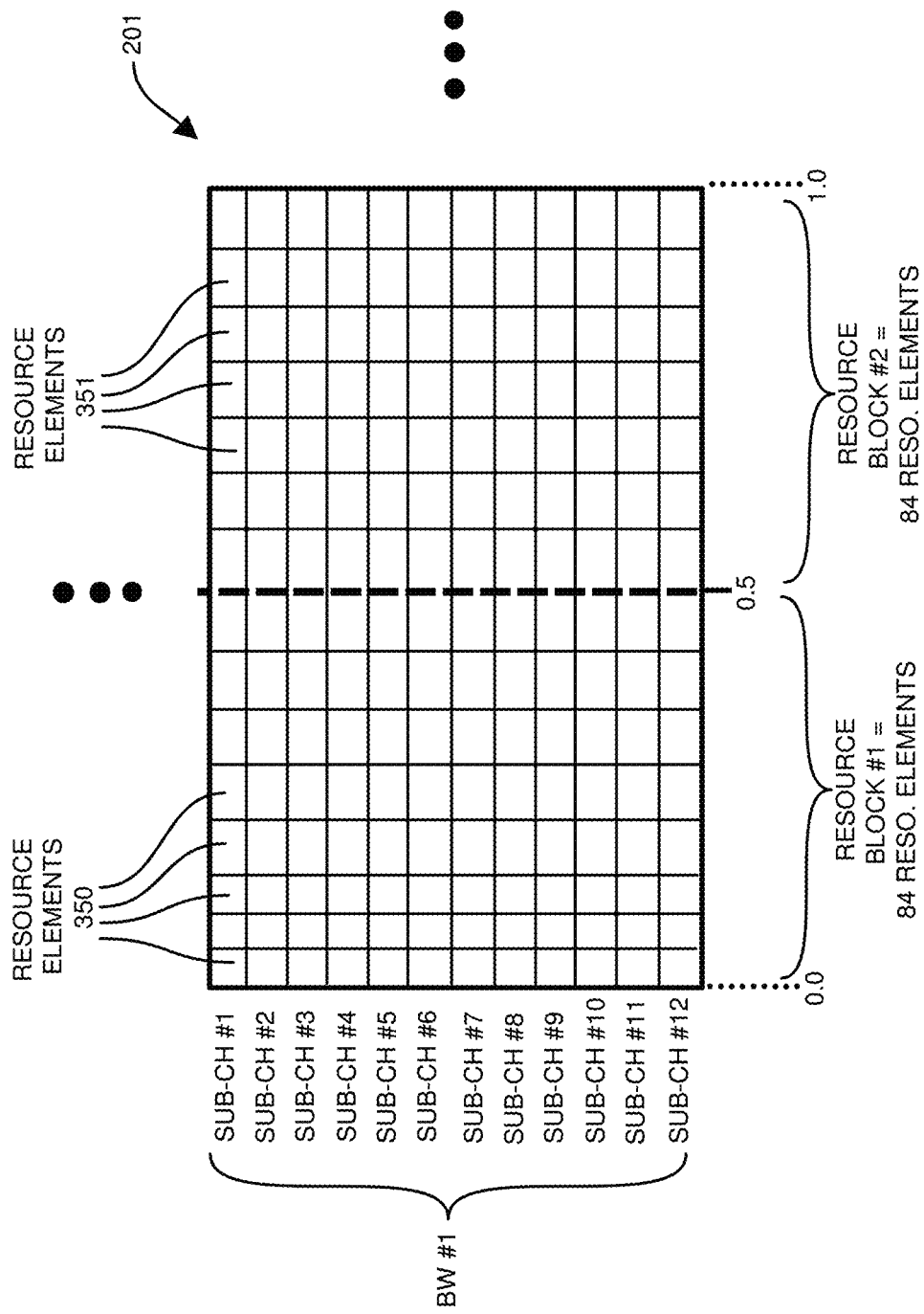
FIG. 4 is an example diagram illustrating attributes of a respective resource block including multiple resource elements according to embodiments herein.

FIG. 4 is an example diagram illustrating attributes of a respective resource block including multiple resource elements according to embodiments herein.

As shown, each resource block can be configured to include twelve sub-carrier frequencies, each supporting a bandwidth of 15 KHz, each carrying 14 OFDM symbols over a respective duration of 1.0 mS. This means each resource block is 15×12=180 KHz wide in frequency and is composed of 12×14=168 resource elements. In one embodiment, each resource element supports transmission of a single symbol (schedule of 168 symbols per resource block). In further example embodiments, each resource block supports 84 resource elements.

FIG. 5 is an example diagram illustrating schedule information according to embodiments herein.

In this example embodiment, the wireless base station 131 or other suitable communication management entity produces schedule information 120 indicating which portions (resource blocks) of communications 125 are to be repeated as communications 125-1 by the repeater wireless station 147.

For example, based on knowledge that the communication devices CD4, CD5, CD6, CD7, and CD8 are only serviced by the wireless base station 131 via direct wireless connectivity and not repeater wireless station 147, the wireless base station 131 or other suitable entity produces the schedule information 120 to indicate not to repeat any received resource blocks for timeslots TS #1, TS #3, TS #4, TS #5, TS #8, and TS #9.

Additionally, based on knowledge that the communication device CD1 and communication device CD2 are serviced by the repeater wireless station 147: the wireless base station 131 produces the schedule information 120 to indicate that resource blocks 21 to 30 and corresponding bandwidth are allocated in timeslot #2 are to be repeated from the repeater wireless station 147 to the communication device CD2; the wireless base station 131 produces the schedule information 120 to indicate that resource blocks 21 to 30 and corresponding bandwidth are allocated in timeslot #6 are to be repeated from the repeater wireless station 147 to the communication device CD1; the wireless base station 131 produces the schedule information 120 to indicate that resource blocks 31 to 50 and corresponding bandwidth are allocated in timeslot #7 are to be repeated from the repeater wireless station 147 to the communication device CD2; the wireless base station 131 produces the schedule information 120 to indicate that resource blocks 21 to 30 and corresponding bandwidth are allocated in timeslot #10 are to be repeated from the repeater wireless station 147 to the communication device CD2.

Thus, the schedule information 120 provides the repeater wireless station 147 an indication of which of the resource blocks are to be repeated by the repeater wireless station 147 to the communication devices CD1 and CD2.

As previously discussed, each resource block provides approximate 200 kilohertz of wireless bandwidth in which to support communication of data between the repeater wireless station 147 and the communication devices CD1 and CD2. In such an instance, allocation of the resource blocks 21 to 30 in timeslot #2 to communication device CD2 provides 2 MHz (MegaHertz) of wireless bandwidth in which to convey data between the repeater wireless station 147 and the communication device CD2; allocation of the resource blocks 21 to 30 in timeslot #6 to communication device CD1 provides 2 MHz (MegaHertz) of wireless bandwidth in which to convey data between the repeater wireless station 147 and the communication device CD2; allocation of the resource blocks 31 to 50 in timeslot #7 to communication device CD2 provides 4 MHz (MegaHertz) of wireless bandwidth in which to convey data between the repeater wireless station 147 and the communication device CD2; allocation of the resource blocks 21 to 30 in timeslot #10 to communication device CD2 provides 2 MHz (MegaHertz) of wireless bandwidth in which to convey data between the repeater wireless station 147 and the communication device CD2.

Figure 6:
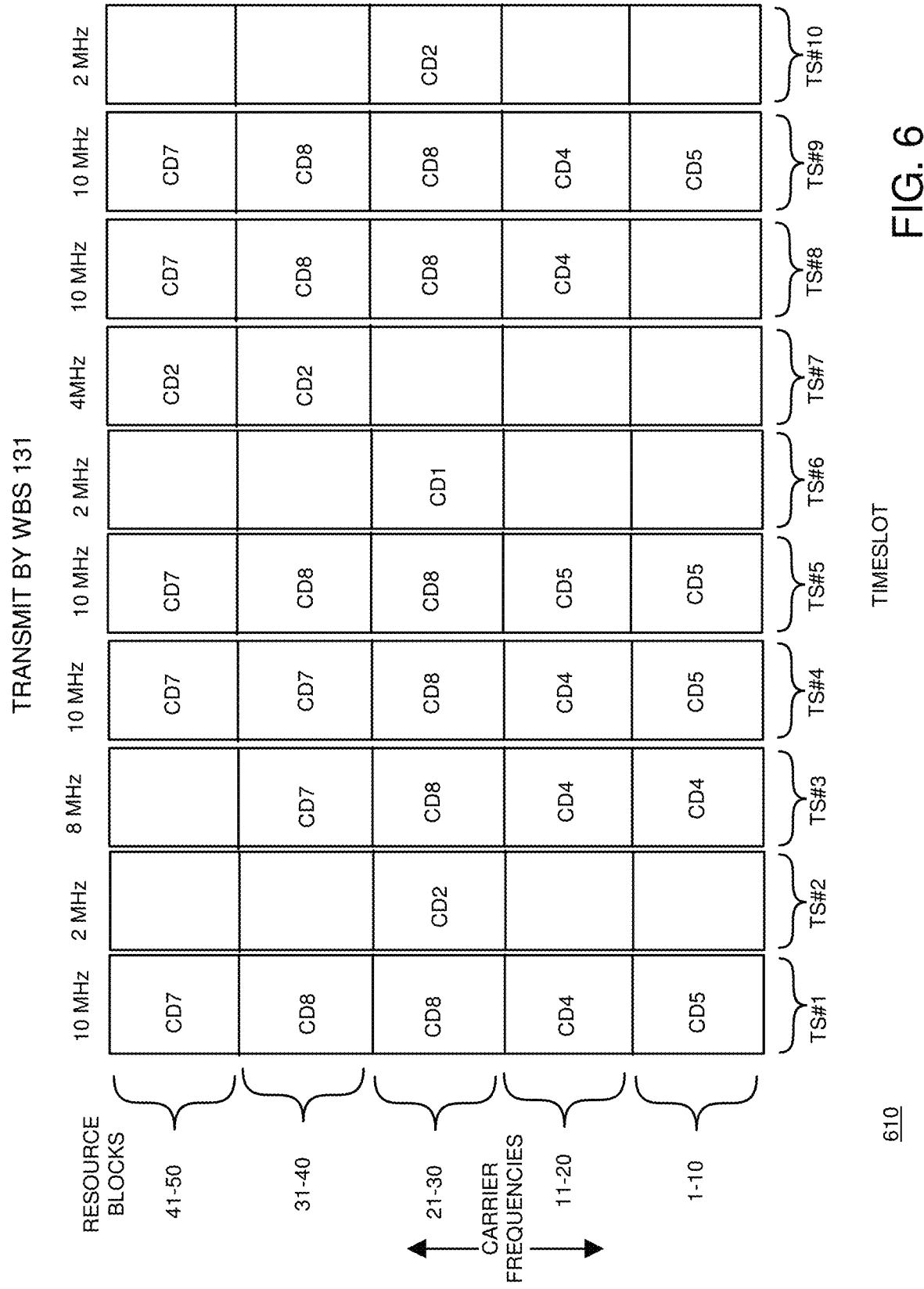
FIG. 6 is an example diagram illustrating assignment of resource blocks to different communication devices in different time slots according to embodiments herein.

FIG. 6 is an example diagram illustrating assignment of resource blocks assigned to different communication devices in different time slots according to embodiments herein.

In this example embodiment, the resource block transmit information 610 indicates assignment of different wireless stations such as communication devices to each of the available resource blocks over different time slots.

For example, resource block transmit information 610 indicates that resource blocks 1 to 10 in timeslot #1 are allocated to communicate with communication device CD5 in region of wireless coverage 155; resource block transmit information 610 (a.k.a., allocation or schedule information) indicates that resource blocks 11 to 20 are allocated to communicate with communication device CD4 in region of wireless coverage 155; resource block transmit information 610 indicates that resource blocks 21 to 30 in timeslot #1 are allocated to communicate with the communication device CD8 in region of wireless coverage 155; resource block transmit information 610 indicates that resource blocks 31 to 40 are allocated to communicate with communication device CD8 in region of wireless coverage 155; resource block transmit information 610 indicates that resource blocks 41 to 50 in timeslot #1 are allocated to communication device CD7 in region of wireless coverage 155; and so on.

Resource block transmit information 610 further indicates that resource blocks 21 to 30 in timeslot #2 are allocated to communicate with communication device CD2 in region of wireless coverage 156 (such as a cell edge or farthest distance from the wireless base station 131). Neither the wireless base station 131 and the repeater wireless station 147 do not transmit communications in resource blocks 1-20 and 31-50.

Resource block transmit information 610 indicates that resource blocks 1 to 20 in timeslot #3 are allocated to communicate with communication device CD4 in region of wireless coverage 155; resource block transmit information 610 indicates that resource blocks 21 to 30 in timeslot #2 are allocated to communicate with communication device CD8 in region of wireless coverage 155; resource block transmit information 610 indicates that resource blocks 31 to 50 are allocated to communicate with communication device CD2; and so on.

Resource block transmit information 610 indicates that resource blocks 21 to 30 timeslot #6 are allocated to communicate with communication device CD1 in region of wireless coverage 156.

Resource block transmit information 610 indicates that resource blocks 31 to 50 timeslot #7 are allocated to communication device CD2 in region of wireless coverage 156.

Figure 7:
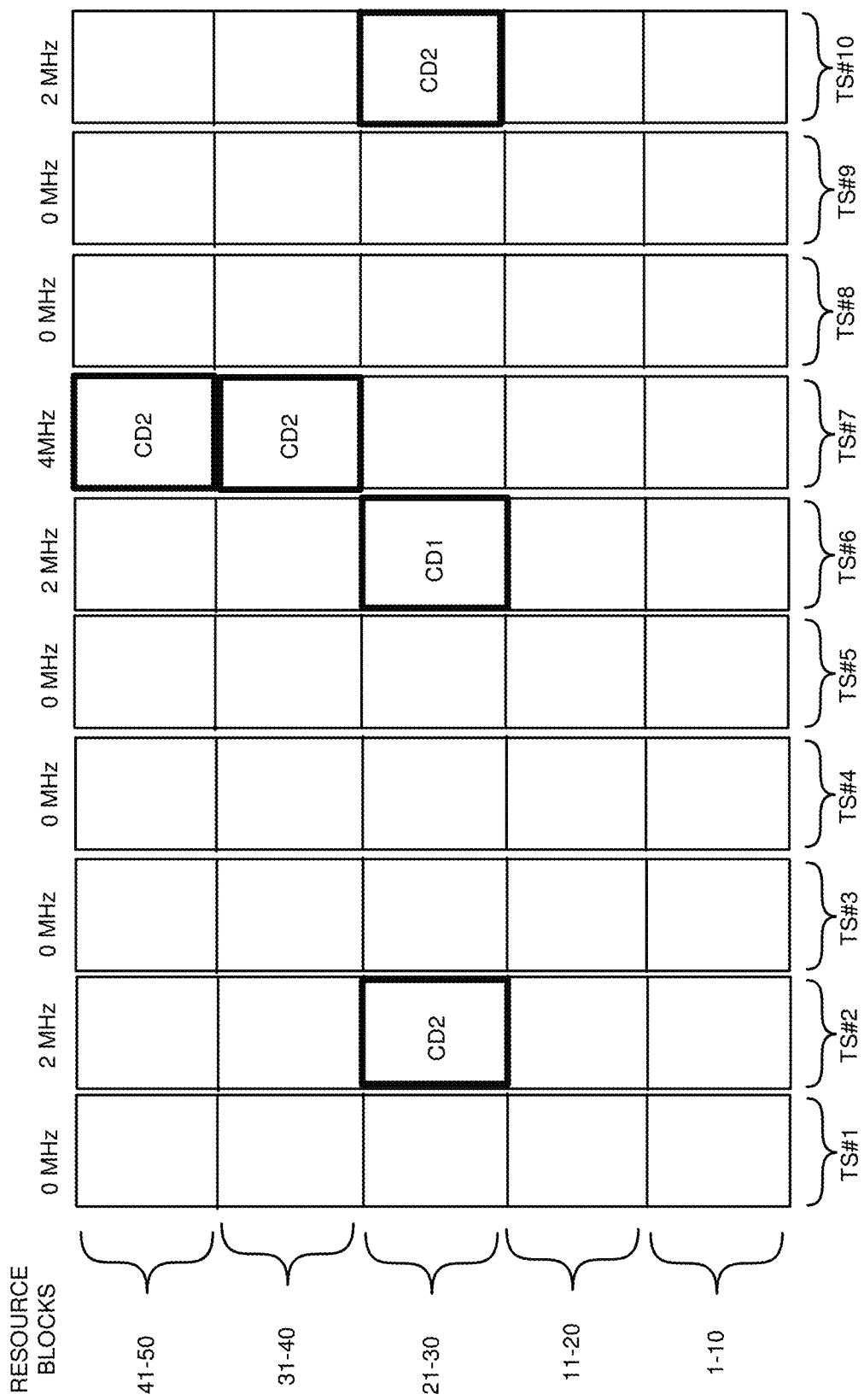
FIG. 7 is an example diagram illustrating selective retransmission of resource blocks from a repeater wireless station in accordance with the schedule information according to embodiments herein.

FIG. 7 is an example diagram illustrating selective retransmission of resource blocks from a repeater wireless station in accordance with the schedule information according to embodiments herein.

As previously discussed, based on the schedule information 120 received by the repeater wireless station 147, the repeater wireless station 147 determines which portions of the received wireless communications 125 are to be repeated to the downstream communication devices CD1 and CD2.

For example, the wireless base station 131 transmits the communications 125 from antenna hardware 132. The repeater wireless station 147 includes antenna hardware 147-1 to monitor presence of wireless signals transmitted in the different time slots and different carrier frequencies associated with the resource blocks 1 to 50.

In this example embodiment, as indicated by resource block re-transmit information 710, during timeslot #1, and in a manner as previously discussed, the antenna hardware 147-1 of repeater wireless station 147 receives the wireless communications 125 from the wireless base station 131. However, because the schedule information 120 indicates not to retransmit any wireless signals received from the wireless base station 131 in timeslot #1, the repeater wireless station 147 prevents retransmission of signals associated with resource blocks 1 to 50 in timeslot #1. Preventing retransmission of the wireless signals in timeslot #1 from the repeater wireless station 147 to the region of wireless coverage 156 reduces wireless interference. Thus, in timeslot #1, because there are no retransmissions by the repeater wireless station 147, and instead of experiencing wireless energy associated with 10 megahertz of bandwidth, the region of wireless coverage 156 and wireless signal sensor 151 is exposed to no wireless energy from the repeater wireless station 147.

Further in this example embodiment, as indicated by resource block re-transmit information 710, during timeslot #2, the antenna hardware 147-1 of repeater wireless station 147 receives the wireless communications 125 from the wireless base station 131. Based on the schedule information 120, the repeater wireless station 147 determines that resource blocks 21 to 30 in timeslot #2 are to be retransmitted. In such an instance, the repeater wireless station 147 retransmits (repeats) only the wireless signals associated with resource blocks 21 to 30 in timeslot #2 (as received from the wireless base station 131) in a downlink direction over antenna hardware 147-2 to the communication device CD1 in the region of wireless coverage 156. Reducing a number of wireless signals (resource blocks) and thus an amount of wireless energy that is retransmitted via the repeater wireless station 147 reduces an amount of wireless interference in the region of wireless coverage 156 caused by the retransmission of wireless signals from the repeater wireless station 147. For example, in timeslot #2, instead of repeating wireless transmission of all the resource blocks 1 through 50 and experiencing wireless energy associated with 10 megahertz of wireless bandwidth, the region of wireless coverage 156 and wireless signal sensor 151 are exposed to only 2 megahertz of bandwidth based on retransmission of resource blocks 21 through 30.

Further in this example embodiment, as indicated by resource block re-transmit information 710, during timeslots #3-5, the antenna hardware 147-1 of repeater wireless station 147 receives the wireless communications 125 from the wireless base station 131. However, because the schedule information 120 indicates not to retransmit any wireless signals received from the wireless base station 131 in timeslots #3 through #5, the repeater wireless station 147 prevents retransmission of signals associated with resource blocks 1 to 50 in each of the timeslots #3 to #5. In a manner as previously discussed, preventing retransmission of the wireless signals in timeslot #1 from the repeater wireless station 147 to the region of wireless coverage 156 reduces wireless interference. Thus, in timeslot #3-5, instead of experiencing wireless energy associated with 10 megahertz of bandwidth, the region of wireless coverage 156 is exposed to no wireless energy from the repeater wireless station 147.

As further shown via resource block re-transmit information 710, the repeater wireless station 147 receives the wireless communications 125 from the wireless base station 131. Based on the schedule information 120, the repeater wireless station 147 determines that resource blocks 21 to 30 in timeslot #6 are to be retransmitted. In such an instance, the repeater wireless station 147 retransmits (repeats) the wireless signals associated with resource blocks 21 to 30 in timeslot #6 in a downlink direction over antenna hardware 147-2 to the communication device CD1. The repeater wireless station 147 prevents retransmitting (repeating) the wireless signals associated with resource blocks 1 to 20 and 31 to 50 in timeslot #6 in a downlink direction over antenna hardware 147-2 to the communication device CD1. Reducing a number of wireless signals and thus an amount of wireless energy that is retransmitted via the repeater wireless station reduces an amount of wireless interference in the region of wireless coverage 156 caused by the retransmission of wireless signals from the repeater wireless station 147.

As further indicated by resource block re-transmit information 710, during timeslot #7, the antenna hardware 147-1 of repeater wireless station 147 receives the wireless communications 125 from the wireless base station 131. Based on the schedule information 120, the repeater wireless station 147 determines that resource blocks 31 to 50 in timeslot #7 are to be retransmitted. In such an instance, the repeater wireless station 147 retransmits (repeats) the wireless signals associated with resource blocks 31 to 50 in timeslot #7 in a downlink direction over antenna hardware 147-2 to the communication devices CD1 at CD2. The repeater wireless station 147 prevents retransmitting (repeating) the wireless signals associated with resource blocks 1 to 30 in timeslot #7 in a downlink direction over antenna hardware 147-2 to the communication devices CD1 at CD2, reducing wireless interference.

As previously discussed, the wireless signal sensor can be configured to monitor a level of wireless energy in the region of wireless coverage 156. In one embodiment, the wireless signal sensor 151 detects that the level of wireless interference during timeslot #7 is above a respective threshold energy level. In such an instance, the wireless signal sensor 151 provides feedback 179 over network 190 to the wireless base station 131 indicating the condition. In response to receiving the feedback 179, the wireless base station 131 updates the repeater schedule information for next time frame and corresponding timeslot #7 such that the repeater wireless station only retransmits 10 resource blocks (corresponding to 2 megahertz). Thus, embodiments herein include controlling retransmission by the repeater wireless station 147 such that wireless communications transmitted by the repeater wireless station 147 to not cause undesirable wireless interference.

Figure 8:
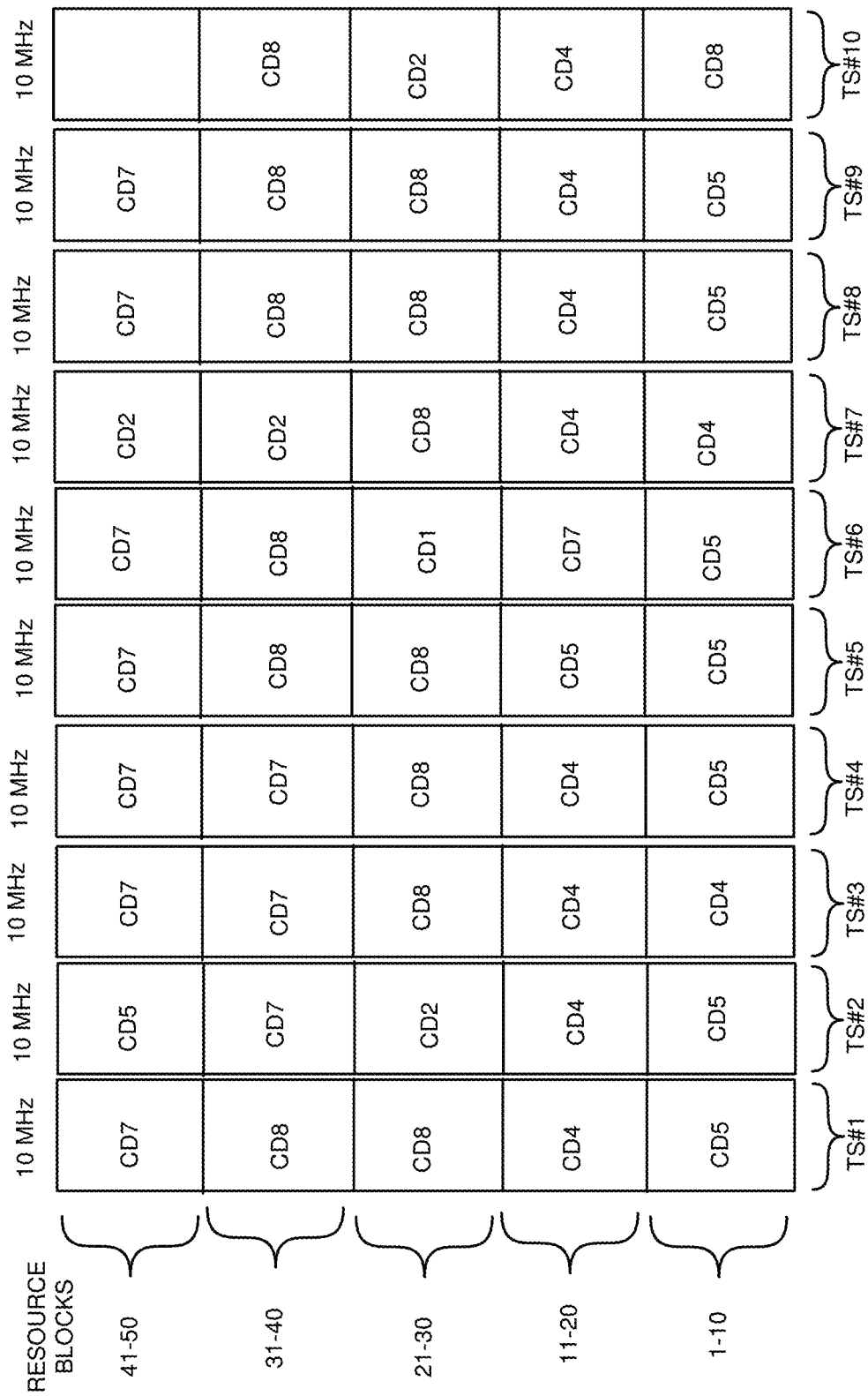
FIG. 8 is an example diagram illustrating assignment of resource blocks to different communication devices in different time slots according to embodiments herein.

FIG. 8 is an example diagram illustrating assignment of resource blocks to different communication devices in different time slots according to embodiments herein.

In this example embodiment, the resource blocks transmit information 810 indicates the timeslots in corresponding resource blocks transmitted by the wireless base station 131. In a manner as previously discussed, the wireless base station 131 transmits respective wireless data to a corresponding communication device via appropriate bandwidth assigned to the resource blocks during a time slot.

For example, in timeslot #1, the wireless base station 131 transmits communications to communication device CD5 via resource blocks 1 through 10; the wireless base station 131 transmits communications to communication device CD4 via resource blocks 11 through 20; wireless base station 131 transmits communications to communication device CD8 via resource blocks 21 to 40; the wireless base station 131 transmits communications to communication device CD 7 in resource blocks 41 through 50.

Figure 9:
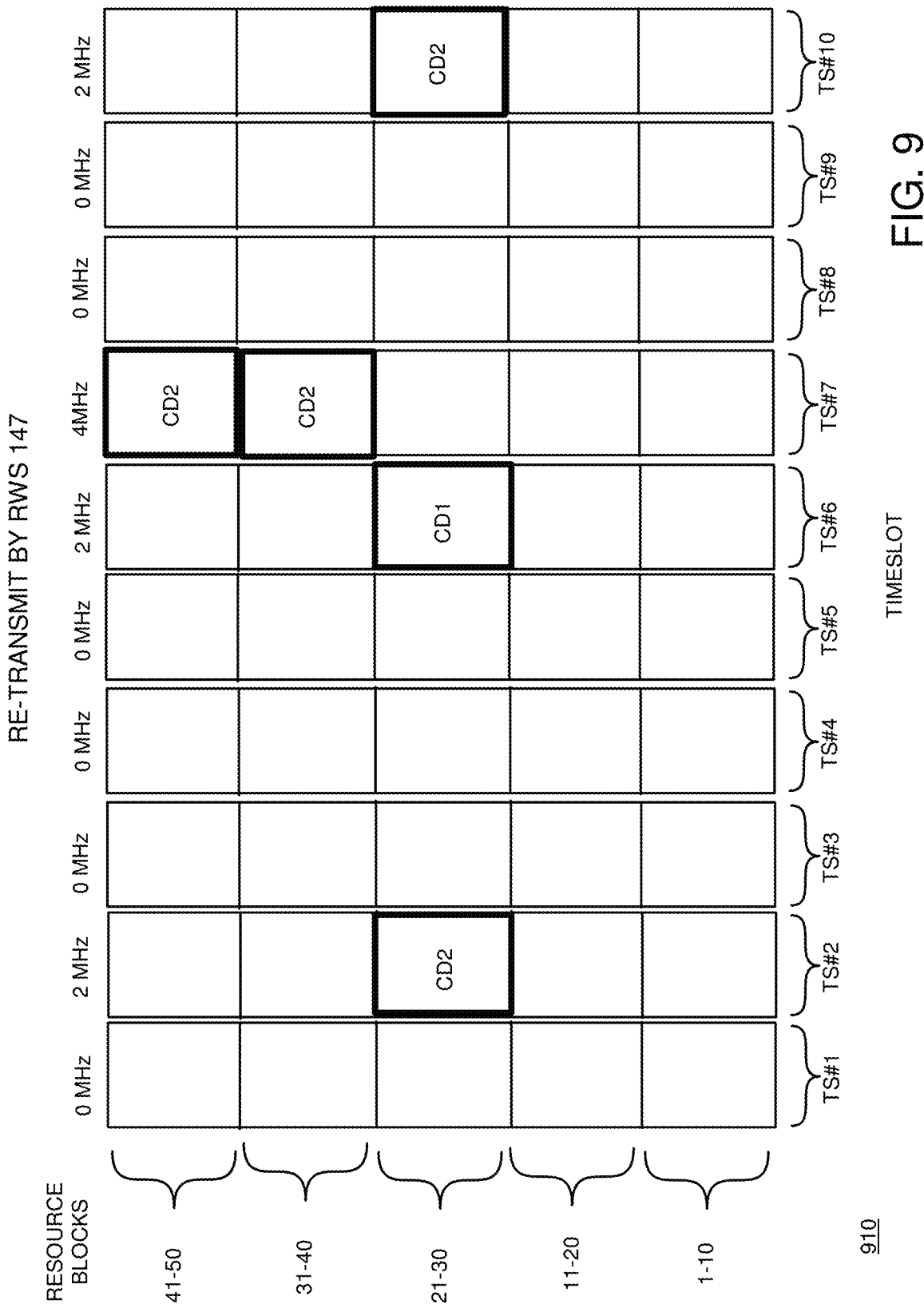
FIG. 9 is an example diagram illustrating selective retransmission of resource blocks from a repeater wireless station in accordance with the schedule information according to embodiments herein.

According to the schedule information 120, the repeater wireless station 147 does not repeat any of the wireless communications transmitted by the wireless base station 131 in timeslot #1 as shown in FIG. 9.

Further, in timeslot #2 of FIG. 8, the wireless base station 131 transmits communications to communication device CD5 via resource blocks 1 through 10; the wireless base station 131 transmits communications to communication device CD4 via resource blocks 11 through 20; wireless base station 131 transmits communications to communication device CD2 via resource blocks 21 to 30; the wireless base station 131 transmits communications to communication device CD7 in resource blocks 31 through 40; the wireless base station 131 transmits communications to communication device CD5 in resource blocks 41 through 50.

In accordance with the schedule information 120, as shown in FIG. 9, the repeater wireless station 147 repeats transmission of received wireless communications in resource blocks 21 through 30 of timeslot #2. The repeater wireless station 147 does not repeat wireless communications in received resource blocks 1 through 20 and 31 through 50.

In timeslot #3 in FIG. 8, the wireless base station 131 transmits communications to communication device CD4 via resource blocks 1 through 20 wireless base station 131 transmits communications to communication device CD8 via resource blocks 21 to 30; the wireless base station 131 transmits communications to communication device CD7 in resource blocks 31 through 50. According to the schedule information 120, the repeater wireless station 147 does not repeat any of the wireless communications transmitted by the wireless base station 131 in timeslot #3 as shown in FIG. 9.

In timeslot #7 in FIG. 8, the wireless base station 131 transmits communications to communication device CD4 via resource blocks 1 through 20; the wireless base station 131 transmits communications to communication device CD8 via resource blocks 21 through 30; wireless base station 131 transmits communications to communication device CD2 via resource blocks 31 to 50. According to the schedule information 120, as shown in FIG. 9, the repeater wireless station 147 repeats transmission of only received wireless communications in resource blocks 31 through 50 of timeslot #7. The repeater wireless station 147 does not repeat wireless communications in received resource blocks 1 through 30.

Figure 10:
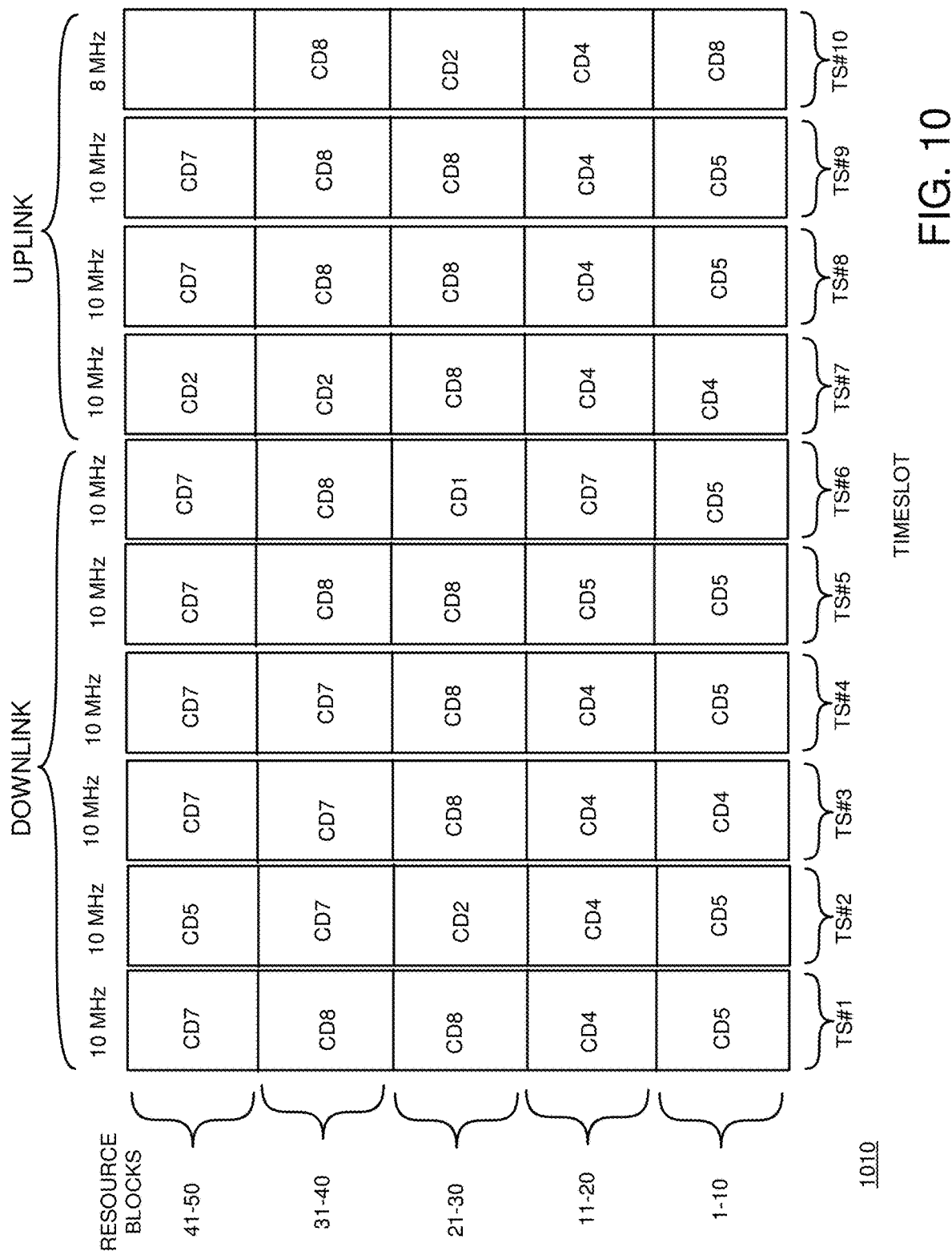
FIG. 10 is an example diagram illustrating assignment of resource blocks to different communication devices in different time slots based on a time-division duplex configuration (supporting uplink and downlink communications) according to embodiments herein.

FIG. 10 is an example diagram illustrating assignment of resource blocks to different communication devices in different time slots based on a time-division duplex configuration according to embodiments herein.

In this example embodiment, the resource block transmit information 1010 supports bidirectional communications. For example, timeslot #1 through time slot #6 are allocated for downstream (downlink) communications from the wireless base station 131 to the communication devices in the region of wireless coverage 155. In a similar manner as previously discussed, a portion of the communications transmitted by the wireless base station 131 are directed in the downlink to communication devices in the region of wireless coverage 156 as well. The schedule information 120 indicates which of the resource blocks (and thus a corresponding wireless carrier frequencies and corresponding modulated data) are to be retransmitted from the repeater wireless station 147 in the downstream to the one or more communication devices CD1 CD2, etc., in the region of wireless coverage 156.

Figure 11:
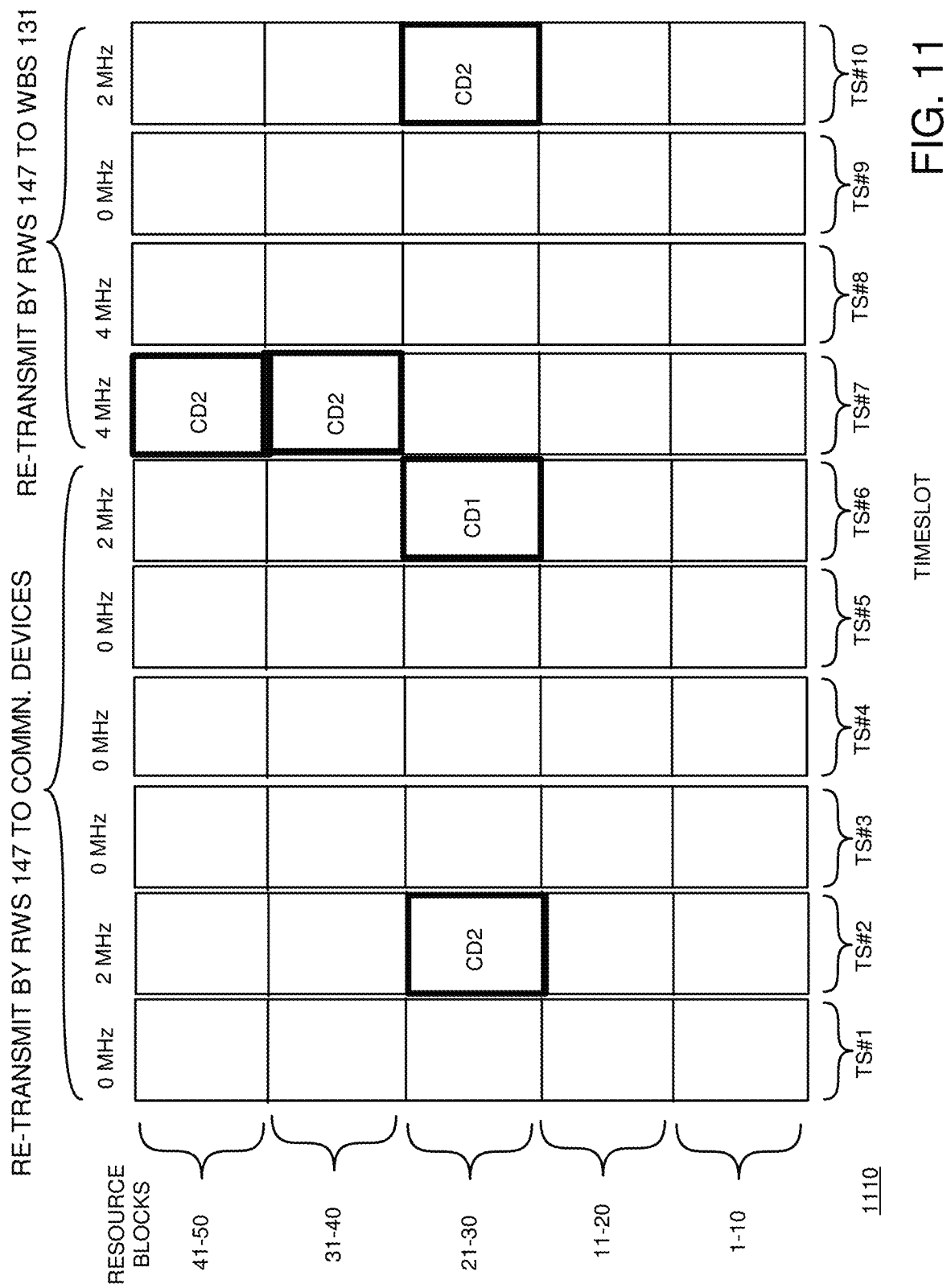
FIG. 11 is an example diagram illustrating selective retransmission of resource blocks from a repeater wireless station in accordance with the schedule information and a time-division duplex configuration according to embodiments herein.

Further in this example embodiment, as shown in FIG. 11, the repeater wireless station 147 repeats only transmission of received wireless communications in resource blocks 21 through 30 in timeslot #2 as well as resource blocks 21 through 30 in timeslot #6 in the downlink direction. This ensures that the communication devices CD1 and CD2 receive respective wireless data in timeslots 2 and 6.

Referring again to FIG. 10, timeslots #7 through #10 are allocated for upstream (uplink) communications from the communication devices in region of wireless coverage 155 and region of wireless coverage 156 to the wireless base station 131. In this example embodiment, the schedule information 120 indicates which of the resource blocks (and thus wireless carrier frequencies and corresponding modulated data) are to be retransmitted from the repeater wireless station 147 in the uplink to the wireless base station 131.

For example, each of the communication devices CD3, CD4, CD5, CD6, CD7, CD8, etc. communicates in the uplink directly to the wireless base station 131. Accordingly, as shown in FIG. 11, because these communication devices are in range of the wireless base station 131, the repeater wireless station 147 does not repeat signals associated with resource blocks 1 to 30 in timeslot #7, resource blocks 1 through 50 in timeslot #8, resource blocks 1 through 50 in timeslot #9, resource blocks 1 through 20 in timeslot #10, resource blocks 31 through 40 in timeslot #10. However, as previously discussed, the communication devices CD1 and CD2 in region of wireless coverage 156 are too far away from the wireless base station 131 to send a sufficiently strong wireless signal. In such an instance, the repeater wireless station 147 receives communications from the communication devices in allocated timeslots in resource blocks and retransmits such communications to the wireless base station 131.

More specifically, the repeater wireless station 147 does not retransmit wireless signals associated with communication devices assigned resource blocks 1 through 30 in timeslot #7; the repeater wireless station 147 does not retransmit wireless signals associated with communication devices assigned resource blocks 1 through 50 in timeslot #8 and timeslot #9; the repeater wireless station 147 does not retransmit wireless signals associated with communication devices assigned resource blocks 1 through 20 and 31-50 in timeslot #10.

Thus, in accordance with embodiments herein, the repeater wireless station 147 controls communications in both the uplink and downlink direction based on a time-division duplex configuration.

Figure 12:
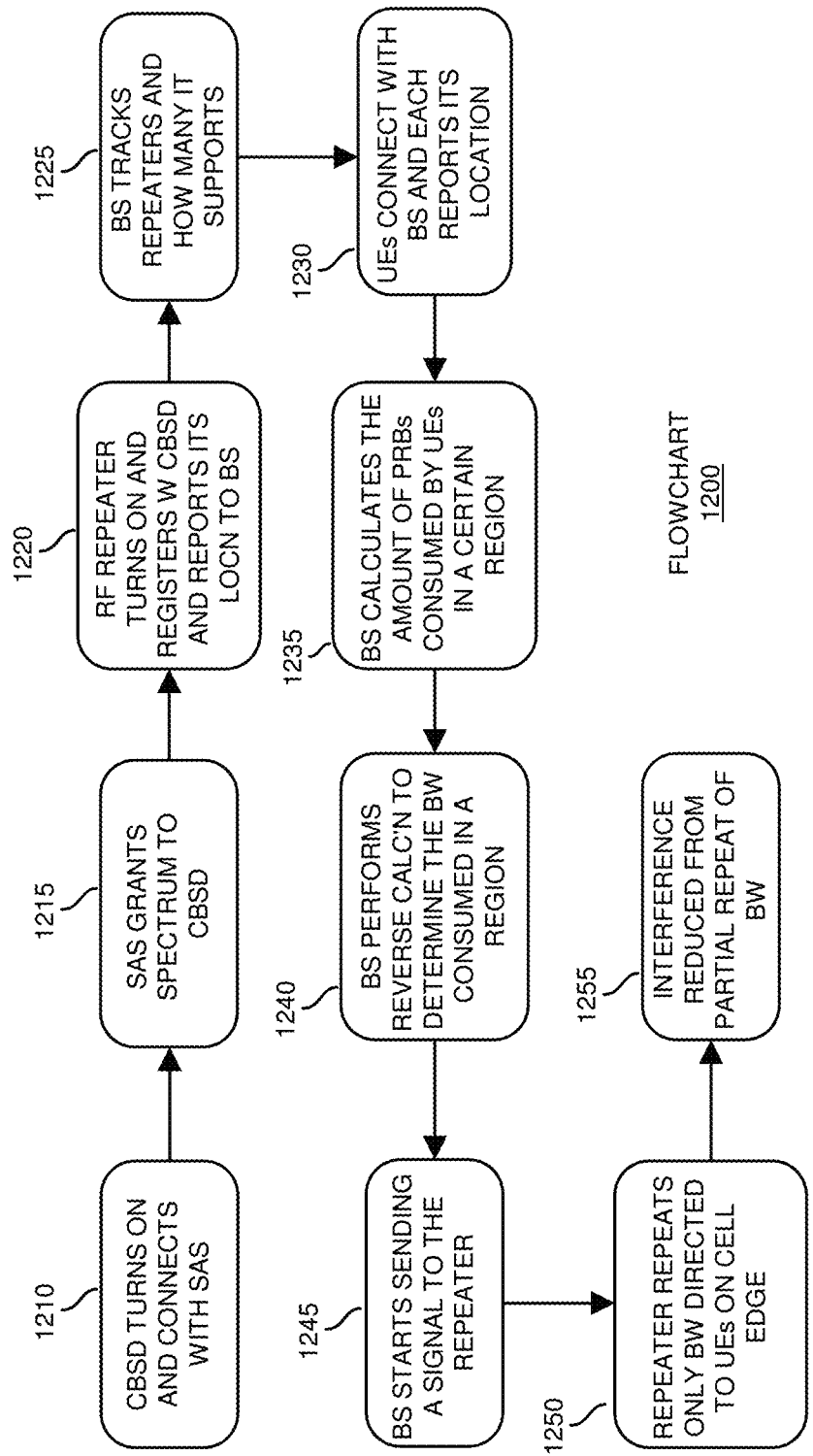
FIG. 12 is an example diagram illustrating operations associated with selective retransmission of wireless signals according to embodiments herein.

FIG. 12 is an example diagram illustrating operations associated with selective retransmission of wireless signals according to embodiments herein.

In processing operation 1210 of flowchart 1200, the wireless base station 131 turns ON and communicates with the channel allocation management resource 141 (such as spectrum access system).

In processing operation 1215, the allocation management resource 141 (such as spectrum access system) grants spectrum (such as one or more wireless channels) to the wireless base station 131 and/or repeater wireless station 137.

In processing operation 1220, the allocation management resource 141 tracks the location of each repeater wireless station (including repeater wireless station 147 at location L47) in the wireless network environment 100.

In processing operation 1225, the base station 131 tracks how many repeater wireless station that it supports.

In processing operation 1230, the communication devices such as communication device CD3, CD4, CD5, CD6, CD7, CD8, etc., establish a respective wireless communication link with wireless base station 131. The communication devices such as communication device CD 1, CD 2, etc. establish a respective wireless communication with the repeater wireless station 147.

The wireless base station 131 keeps track of a respective location in which each of the communication devices resides. For example, the wireless base station 131 detects that the communication device CD1 resides at location L1; the wireless base station 131 detects that the communication device CD2 resides at location L2; the wireless base station 131 detects that the communication device CD3 resides at location L3; the wireless base station 131 detects that the communication device CD4 resides at location L4; the wireless base station 131 detects that the communication device CD5 resides at location L5; the wireless base station 131 detects that the communication device CD6 resides at location L6; the wireless base station 131 detects that the communication device CD7 resides at location L7; the wireless base station 131 detects that the communication device CD8 resides at location L8; and so on. In one embodiment, the wireless base station 131 receives the location information from the different instances of communication devices.

In processing operation 1235, the wireless base station 131 or other suitable communication management entity calculates how many of the physical resource blocks (such as available bandwidth) are consumed by respective communication devices in each of the different regions.

In processing operation 1240, the wireless base station 131 performs a reverse calculation to determine the bandwidth consumed in each respective region of wireless coverage.

In processing operation 1245, the wireless base station 131 starts communicating a signal such as including communications 125 to the repeater wireless station 147.

In processing operation 1250, in accordance with the schedule information 120, the repeater wireless station repeats bandwidth *recta* to communication devices (a.k.a., user equipment) detected as being located on the respective cell edge supported by the repeater wireless station 147.

In processing operation 1255, implementation of the filtered repeating of received wireless signals from the repeater wireless station 147 as controlled by the schedule information 120 reduces a respective wireless interference in the region of wireless coverage in a vicinity of the communication device CD1 and communication device CD2.

Figure 13:
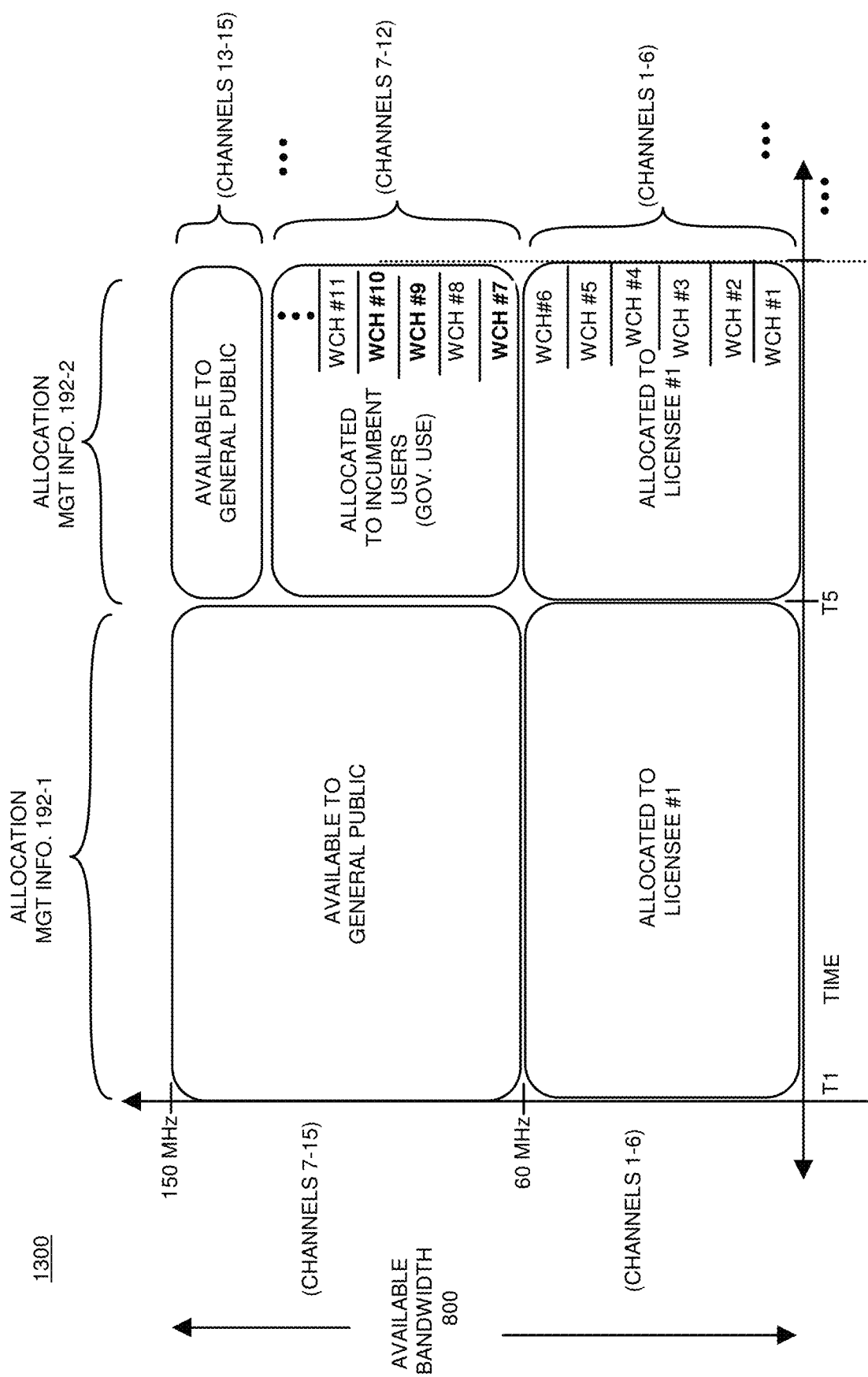
FIG. 13 is an example diagram illustrating a wireless spectrum from which wireless channels are allocated and deallocated according to embodiments herein.

FIG. 13 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices. At or around time T5, the communication management resource 140 deallocates use of the wireless channels #7, #8, #9 and #10 from the wireless base station 131 in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

In this example embodiment as previously discussed, the allocation management resource 140 can be configured to allocate use of wireless channel WCH #1 and wireless channel WCH #2 to one or more wireless base stations. In response to detecting a condition that a respective one or more incumbent entity uses the respective wireless channels, the allocation management resource 140 communicates with the wireless base stations to revoke use of such wireless channels. If available, the allocation management resource 140 allocates use of different wireless channels to the wireless base stations.

Figure 14:
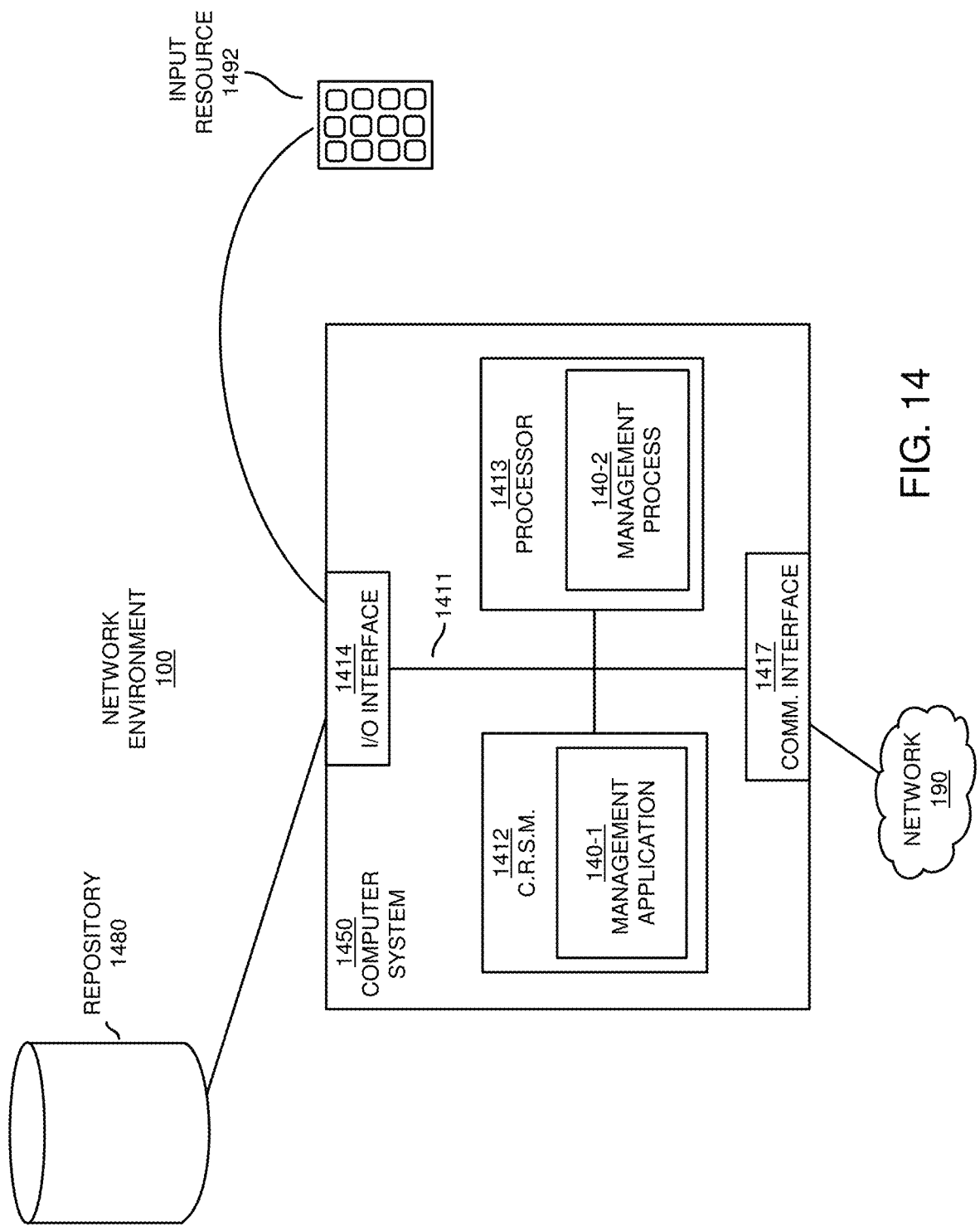
FIG. 14 is an example diagram illustrating example computer architecture operable to execute one or more operations according to embodiments herein.

FIG. 14 is an example block diagram of a computer system for implementing any of the operations as discussed herein according to embodiments herein.

Any of the resources (such as allocation management resource 140, wireless base station 131, repeater wireless station 147, wireless signal sensor 151, etc.) as discussed herein can be configured to include a respective instantiation of computer processor hardware and corresponding executable instructions to carry out the different operations as discussed herein. For example, communication management resource 1440 (such as instantiation of allocation management resource 140, wireless base station 131, communication management resource 141, repeater wireless station 147, communication management resource 137, or wireless signal sensor 151) can be configured to execute the management application 1440-1.

As shown, computer system 1450 of the present example includes an interconnect 1411 that couples computer readable storage media 1412 such as a non-transitory type of media (i.e., any type of hardware storage medium) from which digital information is stored and retrieved, a processor 1413, I/O interface 1414, and a communications interface 1417.

I/O interface 1414 supports connectivity to repository 1480 and input resource 1492.

Computer readable storage medium 1412 can be any hardware storage device such as memory, optical storage, hard drive, floppy disk, etc. In one embodiment, the computer readable storage medium 1412 stores instructions and/or data.

As shown, computer readable storage media 1412 can be encoded with management application 140-1 (e.g., including instructions) to carry out any of the operations as discussed herein.

During operation of one embodiment, processor 1413 accesses computer readable storage media 1412 via the use of interconnect 1411 in order to launch, run, execute, interpret or otherwise perform the instructions in management application 1440-1 stored on computer readable storage medium 1412. Execution of the management application 1440-1 produces management process 1440-2 to carry out any of the operations and/or processes as discussed herein.

Those skilled in the art will understand that the computer system 1450 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowcharts in FIG. 15. Note that the steps in the flowcharts below can be executed in any suitable order.

Figure 15:
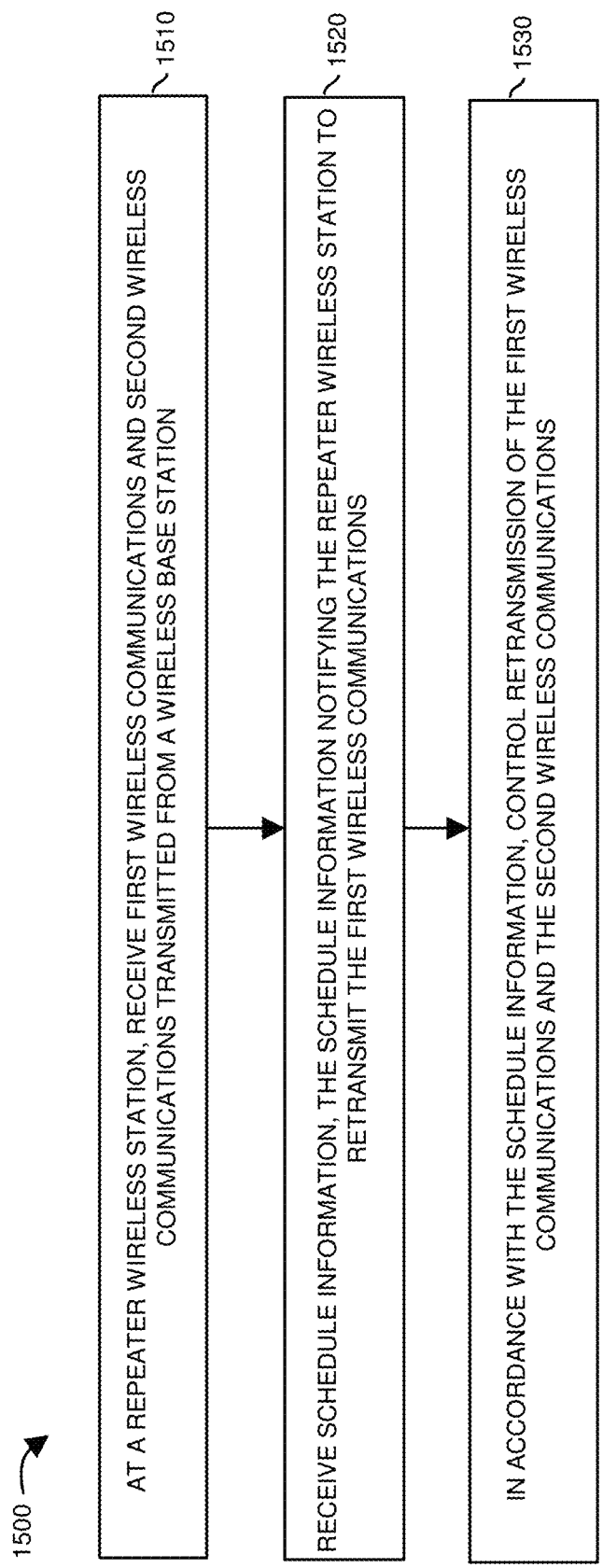
FIG. 15 is an example diagram illustrating a method according to embodiments herein.

FIG. 15 is a flowchart 1500 illustrating an example method according to embodiments. Note that there will be some overlap with respect to concepts as discussed above.

In processing operation 1510, a repeater wireless station 147 receives first wireless communications 125 (signal A). The wireless communications 125 include first wireless communications and second wireless communications transmitted from a wireless base station 131.

In processing operation 1520, the repeater wireless station 147 receives schedule information 120. The schedule information 120 notifies the repeater wireless station 147 to retransmit the first wireless communications in the received wireless communications 125.

In processing operation 1530, in accordance with the schedule information 120, the repeater wireless station 147 controls retransmission of the first wireless communications and the second wireless communications.

Note again that techniques herein are well suited to reduce interference in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   at a repeater wireless station;
   receiving schedule information, the schedule information indicating how to control retransmission operations associated with the repeater wireless station;
   receiving first wireless communications and second wireless communications transmitted from a wireless base station; and
   as specified by the schedule information: i) retransmitting the first wireless communications from the repeater wireless station, the retransmitted first wireless communications being a replica of the first wireless communications received from the wireless base station; and ii) preventing retransmission of the second wireless communications from the repeater wireless station.

2. The method as in claim 1, wherein the schedule information indicates to retransmit the first wireless communications from the repeater wireless station; and
   wherein the schedule information indicates to prevent retransmission of the second wireless communications from the repeater wireless station.

3. The method as in claim 1 further comprising:
   synchronizing the repeater wireless station with the wireless base station to receive the first wireless communications and the second wireless communications from the wireless base station in different timeslots over a wireless communication link, the wireless communication link established between the wireless base station and the repeater wireless station.

4. The method as in claim 3, wherein the schedule information specifies that a first time slot of multiple timeslots associated with the wireless communication link is assigned to the repeater wireless station for repeating, the method further comprising:
   at the repeater wireless station, determining from the schedule information that the repeater wireless station is assigned the first time slot in which to receive the first wireless communications from the wireless base station over the wireless communication link.

5. The method as in claim 4 further comprising:
   receiving the first wireless communications from the wireless base station in the first time slot; and
   as specified by the schedule information indicating to retransmit the first wireless communications received in the first time slot, re-transmitting the first wireless communications from the repeater wireless station to a first mobile communication device.

6. The method as in claim 5, wherein the schedule information specifies that a second time slot of the multiple timeslots is assigned to the repeater wireless station, the method further comprising:
   at the repeater wireless station, determining from the schedule information that the repeater wireless station is assigned the second time slot in which to retransmit third wireless communications over the wireless communication link.

7. The method as in claim 6 further comprising:
   receiving the third wireless communications from the wireless base station in the second time slot; and
   as specified by the schedule information indicating to retransmit the third wireless communications received in the second time slot, re-transmitting the third wireless communications from the repeater wireless station to a second mobile communication device, the retransmitted third wireless communications being a replica of the third wireless communications received from the wireless base station.

8. The method as in claim 1 further comprising:
   at the repeater wireless station, receiving the schedule information from the wireless base station.

9. The method as in claim 1,
   wherein retransmitting the first wireless communications from the repeater wireless station includes re-transmitting the first wireless communications, as received in a first time slot, from the repeater wireless station to a first mobile communication device, the method further comprising:
   as specified by the schedule information, re-transmitting third wireless communications received from the wireless base station in a second time slot, the third wireless communications transmitted from the repeater wireless station to a second mobile communication device.

10. The method as in claim 1, wherein the first wireless communications are destined for delivery to a first mobile communication device; and
    wherein the second wireless communications are destined for delivery to a second mobile communication device.

11. The method as in claim 10, wherein the first mobile communication device resides in a first region of wireless coverage supported by the repeater wireless station; and
    wherein the second mobile communication device resides in a second region of wireless coverage supported by the wireless base station, the first region of wireless coverage residing outside of the second region of wireless coverage.

12. The method as in claim 10, wherein retransmitting the first wireless communications includes: from the repeater wireless station, retransmitting the replica of the first wireless communications to the first mobile communication device.

13. The method as in claim 12, wherein the schedule information is encoded to prevent retransmission of the second wireless communications from the repeater wireless station in response to the wireless base station transmitting the second wireless communications directly to the second mobile communication device.

14. The method as in claim 1, wherein the schedule information specifies that a first time slot of multiple timeslots is assigned to the repeater wireless station for retransmitting the first wireless communications.

15. The method as in claim 14, wherein the schedule information specifies that the repeater wireless station is assigned the first time slot in which to receive the first wireless communications over a wireless communication link.

16. The method as in claim 14, wherein the schedule information specifies that a second time slot of the multiple timeslots is not assigned to the repeater wireless station for retransmission of any wireless communications received from the wireless base station.

17. The method as in claim 1, wherein the schedule information specifies an amount of wireless bandwidth to support retransmission of the first wireless communications.

18. The method as in claim 1, wherein the schedule information specifies at least one carrier frequency at which to retransmit the received first wireless communications.

19. The method as in claim 18, wherein the schedule information specifies a time slot of multiple timeslots in which to retransmit the replica of the first wireless communications from the repeater wireless station to a first mobile communication device to which the first wireless communications are destined for delivery.

20. The method as in claim 1, wherein the schedule information indicates a first direction in which the repeater wireless station is to retransmit the first wireless communications in a first time slot of multiple timeslots to a first mobile communication device.

21. The method as in claim 20, wherein the schedule information indicates a second direction in which the repeater wireless station is to retransmit third wireless communications received from the first mobile communication device to the wireless base station in a second time slot of the multiple timeslots.

22. The method as in claim 1, wherein the first wireless communications are destined for delivery to a first mobile communication device residing in a first region of wireless coverage supported by the repeater wireless station; and
wherein the second wireless communications are destined for delivery to a second mobile communication device residing in a second region of wireless coverage supported by the wireless base station, the first region of wireless coverage being disposed outside of the second region of wireless coverage.

23. The method as in claim 1, wherein the first wireless communications are destined for delivery to a first mobile communication device residing in a first region of wireless coverage supported by the repeater wireless station, the first region of wireless coverage disposed between the wireless base station and the repeater wireless station; and
wherein the second wireless communications are destined for delivery to a second mobile communication device residing in a second region of wireless coverage supported by the wireless base station.

24. A system comprising:
a repeater wireless station operative to:
receive schedule information controlling operation of the repeater wireless station;
receive first wireless communications and second wireless communications from a wireless base station; and
as specified by the schedule information: i) retransmit the first wireless communications from the repeater wireless station, the retransmitted first wireless communications being a replica of the first wireless communications received from the wireless base station, and ii) prevent retransmission of the second wireless communications from the repeater wireless station.

25. The system as in claim 24, wherein the schedule information indicates to retransmit the first wireless communications from the repeater wireless station; and
wherein the schedule information indicates to prevent retransmission of the second wireless communications from the repeater wireless station.

26. The system as in claim 24, wherein the repeater wireless station is further operative to:
synchronize the repeater wireless station with the wireless base station to receive the first wireless communications and the second wireless communications in different timeslots over a wireless communication link from the wireless base station.

27. The system as in claim 26, wherein the schedule information specifies that a first time slot of multiple timeslots is assigned to the repeater wireless station, wherein the repeater wireless station is further operative to:
decode the schedule information to identify that the repeater wireless station is assigned the first time slot in which to receive the first wireless communications.

28. The system as in claim 27, wherein the repeater wireless station is further operative to:
receive the first wireless communications from the wireless base station in the first time slot; and
in accordance with the schedule information, re-transmit the first wireless communications from the repeater wireless station to a first mobile communication device.

29. The system as in claim 28, wherein the schedule information specifies that a second time slot of the multiple timeslots is assigned to the repeater wireless station; and
wherein the repeater wireless station is further operative to:
decode the schedule information to identify that the repeater wireless station is assigned the second time slot in which to repeat the first wireless communications.

30. The system as in claim 29, wherein the repeater wireless station is further operative to:
receive the second wireless communications from the wireless base station in the second time slot; and
in accordance with the schedule information, re-transmit the second wireless communications from the repeater wireless station to a second mobile communication device.

31. The system as in claim 24, wherein the repeater wireless station is further operative to:
at the repeater wireless station, receive the schedule information from the wireless base station.

32. The system as in claim 24, wherein the repeater wireless station is further operative to:
in accordance with the schedule information: i) re-transmit the first wireless communications, as received in a first time slot, from the repeater wireless station to a first mobile communication device, and ii) re-transmit the second wireless communications, as received in a second time slot, from the repeater wireless station to a second mobile communication device.

33. Computer-readable storage hardware having instructions stored thereon, the instructions, when carried out by computer processor hardware, cause the computer processor hardware to manage operation of a repeater wireless station, the communication processor hardware operative to:
receive schedule information:
receive first wireless communications and second wireless communications from the wireless base station; and as specified by the schedule information: i) retransmit the first wireless communications from the repeater wireless station, the retransmitted first wireless communications being a replica of the first wireless communications received from the wireless base station, and ii) prevent retransmission of the second wireless communications from the repeater wireless station.

\* \* \* \* \*

UNITED STATES PATENT AND TRADEMARK OFFICE
CERTIFICATE OF CORRECTION

PATENT NO. : 12,199,765 B2
APPLICATION NO. : 17/506858
DATED : January 14, 2025
INVENTOR(S) : Volkan Sevindik Page 1 of 1

It is certified that error appears in the above-identified patent and that said Letters Patent is hereby corrected as shown below:

In the Claims

Claim 1, Line 2, replace ";" with --:--
Claim 33, Line 6, replace ":" with --;--

Signed and Sealed this
Twenty-ninth Day of April, 2025

Coke Morgan Stewart
*Acting Director of the United States Patent and Trademark Office*